(12) United States Patent
Tian et al.

(10) Patent No.: US 11,787,495 B2
(45) Date of Patent: Oct. 17, 2023

(54) FOLDABLE BICYCLE AND ELECTRIC BICYCLE FRAME

(71) Applicants: Jialong Tian, Shanxi (CN); Jiazheng Tian, Shanxi (CN)

(72) Inventors: Jialong Tian, Shanxi (CN); Jiazheng Tian, Shanxi (CN)

(73) Assignee: Jialong Tian, Shanxi (CN)

( * ) Notice: Subject to any disclaimer, the term of this patent is extended or adjusted under 35 U.S.C. 154(b) by 73 days.

(21) Appl. No.: 17/348,798

(22) Filed: Jun. 16, 2021

(65) Prior Publication Data

US 2022/0355886 A1 Nov. 10, 2022

(51) Int. Cl.
*B62K 15/00* (2006.01)
*B62K 25/28* (2006.01)
*B62M 6/90* (2010.01)

(52) U.S. Cl.
CPC ............ *B62K 15/006* (2013.01); *B62K 25/28* (2013.01); *B62M 6/90* (2013.01)

(58) Field of Classification Search
CPC .............................. B62K 15/006; B62K 25/28
USPC ........................................................ 280/278
See application file for complete search history.

(56) References Cited

U.S. PATENT DOCUMENTS 4,322,088 A * 3/1982 Miyakoshi ........... B62K 25/286
180/227

FOREIGN PATENT DOCUMENTS

CN 201761600 U * 3/2011
CN 204979054 U * 1/2016

* cited by examiner

*Primary Examiner* — Kevin Hurley
*Assistant Examiner* — Hosam Shabara

(57) ABSTRACT

The invention discloses a foldable bicycle and electric bicycle frame, comprising a girder and a rear fork, wherein the girder and the rear fork are connected to a rotating shaft through a bearing; both sides of the girder are provided with fixing holes A, and the girder is connected to the upper part of a hinge through the fixing holes A; the lower part of the hinge is provided with fixing holes B, and the hinge is connected to the upper part of a shock absorber through the fixing holes B; the lower part of the shock absorber is connected to the rear fork through a fixing hole C; both ends of the rear fork are provided with end covers. The invention has a simple structure. The invention can be used for folding bicycles and electric bicycles.

4 Claims, 5 Drawing Sheets

FOLDABLE BICYCLE AND ELECTRIC BICYCLE FRAME

BACKGROUND OF THE INVENTION

1. Field of the Invention

The invention relates to the technical field of bicycle frame, in particular to a foldable bicycle and electric bicycle frame.

2. Description of the Related Art

Bicycles and electric bicycles have been widely used as people's means of transportation, and they have derived various forms. With the rapid development of transportation and the upgrading of roads, bicycles have to face new use environments such as high-rise residential buildings, urban public transportation and transfers. Current folding bicycles generally have the disadvantages of complex structure, inconvenient use and high cost, which cannot satisfy people's use.

SUMMARY OF THE INVENTION

The invention is to solve the shortcomings existing in the prior art, and to provide a foldable bicycle and electric bicycle frame, comprising a girder and a rear fork, wherein the girder and the rear fork are connected to a rotating shaft through a bearing; both sides of the girder are provided with fixing holes A, and the girder is connected to the upper part of a hinge through the fixing holes A; the lower part of the hinge is provided with fixing holes B, and the hinge is connected to the upper part of a shock absorber through the fixing holes B; the lower part of the shock absorber is connected to the rear fork through a fixing hole C; both ends of the rear fork are provided with end covers;

the oblique upper part of the side wall of the girder relative to the fixing hole A is provided with a safety bolt hole; the top of the hinge is provided with an open safety bolt hole;

the open safety bolt hole and the safety bolt hole are matched with each other.

Further, one end of the girder is provided with a clamping piece, and the clamping piece is provided with a clamping hook; when the rear fork rotates together with the shock absorber until the top of the shock absorber is inside the clamping hook, the shock absorber comes into a shock absorption effect.

Further, the fixing holes A, the fixing holes B, and the fixing holes C are connected by nuts after passing through a fixing screw; the safety bolt passes through the safety bolt hole for fixing the shock absorber and the rear fork.

Further, both sides of the rotating shaft is installed with a pedal crank and a chain ring.

Further, the clamping piece is provided with a seat post mounting hole and two screw holes; the seat post mounting hole is used for the mounting of a seat pole, and the two screw holes are used to connect the girder and the hinge, and at the same time to fix the seat post.

Further, the inside of the girder is hollow, and the inside thereof can be provided with a battery pack and a controller.

After adopting the above technical solutions, the invention has the following advantageous effects:

The invention has a simple structure. After loosening the safety bolt, loosening the fixed screw, rotating the rear fork clockwise, and the shock absorber and the hinge are driven to rotate together to a certain position, and then tightening the fixing bolt to locate and lock the rear fork. The whole product adopts a multi-purpose way of one axle, which realizes that the pedal axle and the folding axle can be shared, thereby reducing the frame components, reducing the weight of the whole bicycle, making the overall structure simpler, more convenient to fold, with a low manufacturing cost. The invention can be used for folding bicycles and electric bicycles.

In the figures, 1 refers to the girder; 2 refers to the rear fork; 3 refers to the rotating shaft; 4 refers to the fixing hole A; 5 refers to the fixing hole B; 6 refers to the fixing hole C; 7 refers to the safety bolt hole; 8 refers to the open safety bolt hole; 9 refers to the hinge; 10 refers to the shock absorber; 11 refers to the clamping hook; 12 refers to the clamping piece; 13 refers to the bearing; 14 refers to the end cover; 15 refers to the seat post mounting hole; 16 refers to the screw hole.

DETAILED DESCRIPTION OF THE PREFERRED EMBODIMENTS

The invention will be further described hereinafter with reference to the drawings.

Figure 1:
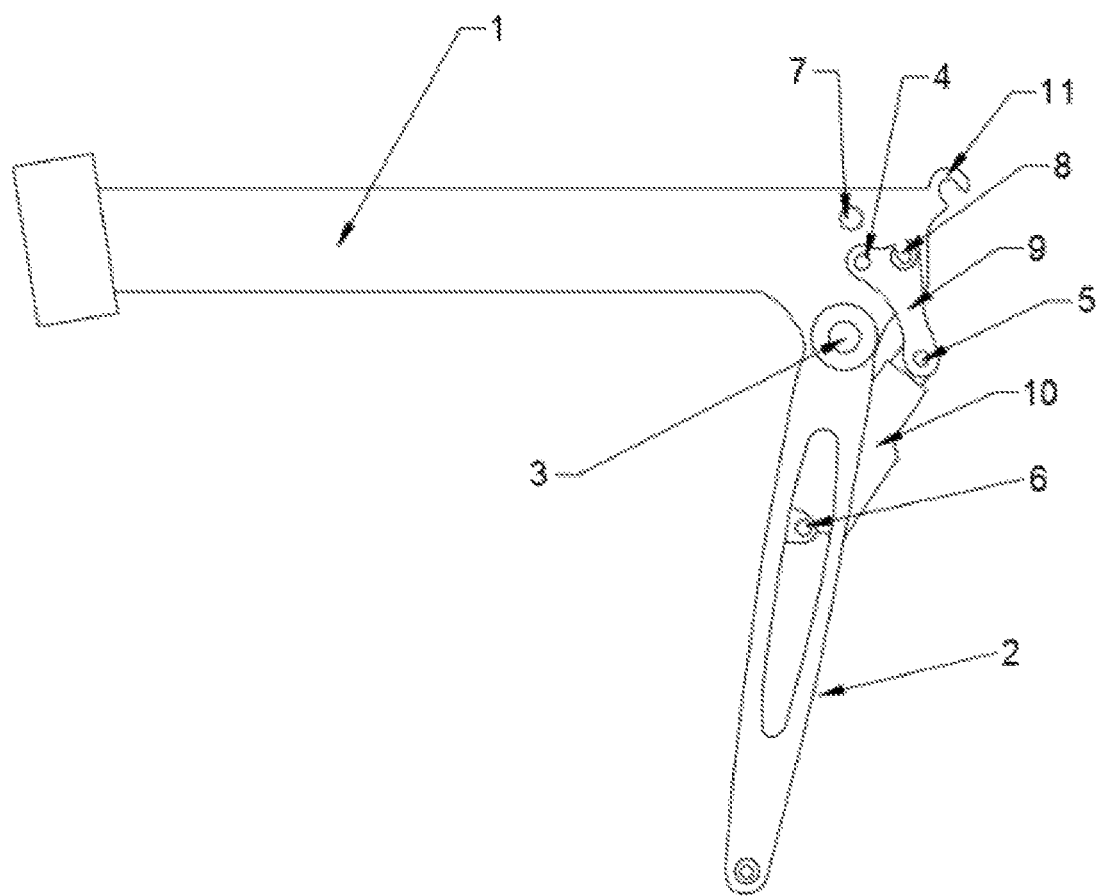
FIG. 1 is a schematic view of the structure of the invention.
Figure 2:
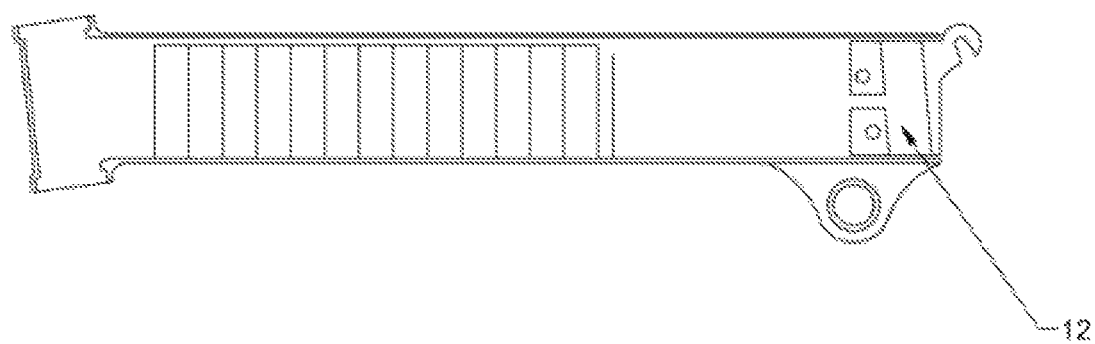
FIG. 2 is a schematic view of the structure of the girder in the invention.
Figure 3:
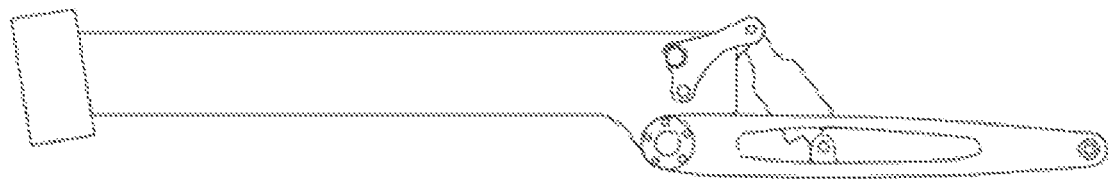
FIG. 3 is a schematic view of the structure of the invention unfolded.
Figure 4:
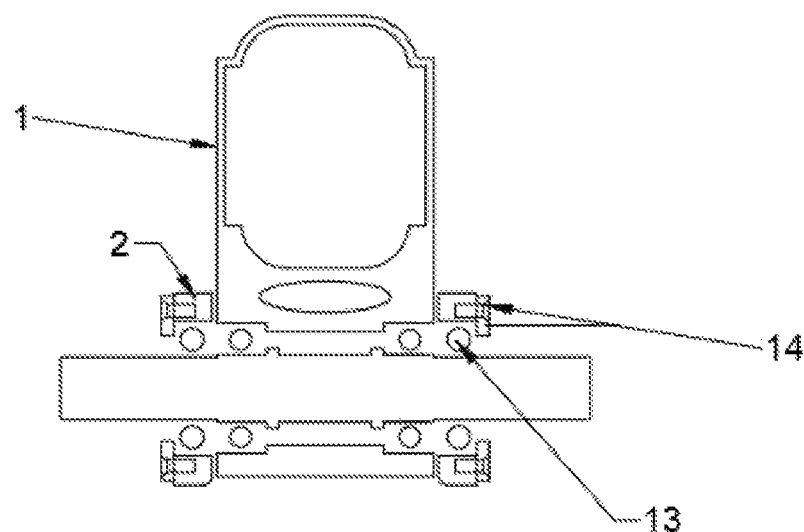
FIG. 4 is a schematic view of the side structure of the invention.
Figure 5:
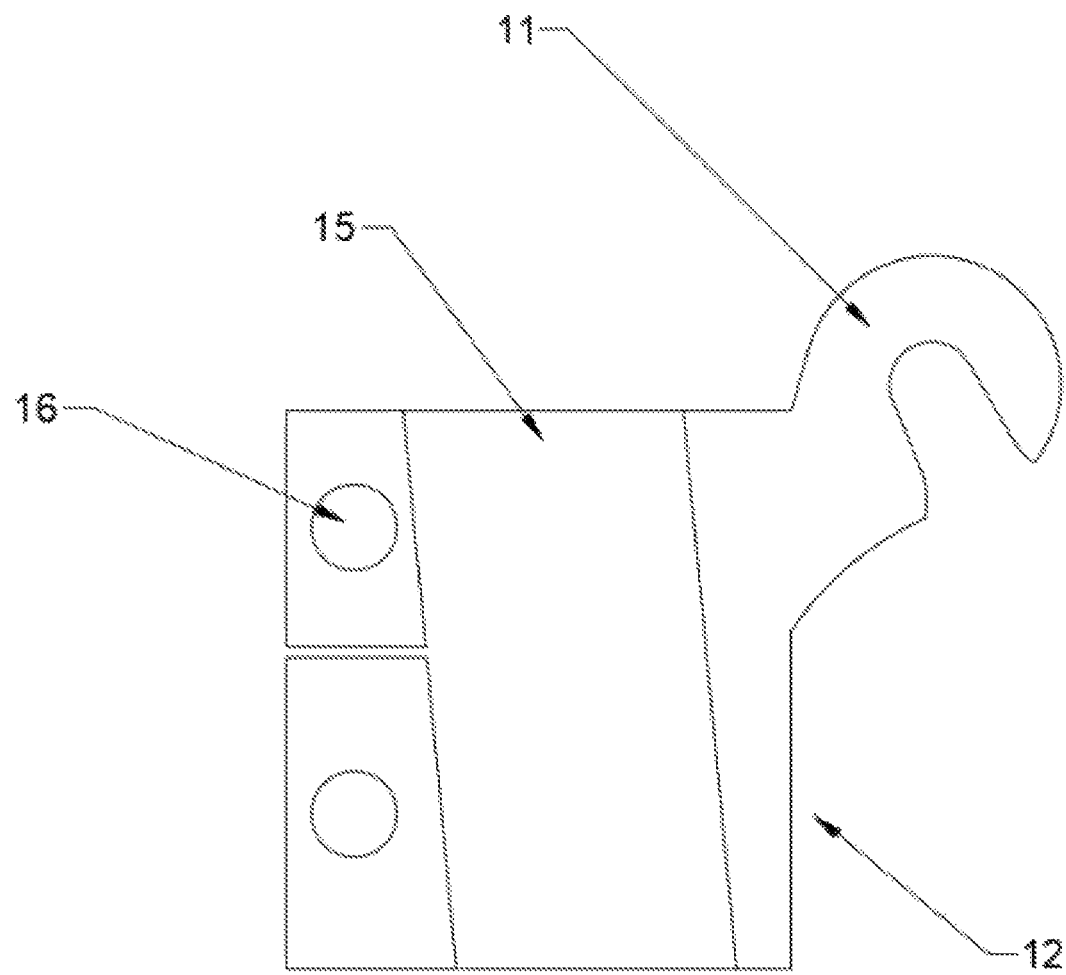
FIG. 5 is a schematic view of the structure of the hinge in the invention.

Embodiment 1: as shown in FIG. 1-FIG. 5, a foldable bicycle and electric bicycle frame, comprising a girder 1 and a rear fork 2, wherein the girder 1 and the rear fork 2 are connected to a rotating shaft 3 through a bearing 13; both sides of the girder 1 are provided with fixing holes A 4, and the girder 1 is connected to the upper part of a hinge 9 through the fixing holes A 4; the lower part of the hinge 9 is provided with fixing holes B 5, and the hinge 9 is connected to the upper part of a shock absorber 10 through the fixing holes B 5; the lower part of the shock absorber 10 is connected to the rear fork 2 through a fixing hole C 6; both ends of the rear fork 2 are provided with end covers 14;

the oblique upper part of the side wall of the girder 1 relative to the fixing hole A 4 is provided with a safety bolt hole 7; the top of the hinge 9 is provided with an open safety bolt hole 8; the open safety bolt hole 8 and the safety bolt hole 7 are matched with each other.

One end of the girder 1 is provided with a clamping piece 12, and the clamping piece 12 is provided with a clamping hook 11; when the rear fork 2 rotates together with the shock absorber until the top of the shock absorber 10 is inside the clamping hook 11, the shock absorber 10 comes into a shock absorption effect.

The fixing holes A 4, the fixing holes B 5, and the fixing holes C 6 are connected by nuts after passing through a fixing screw; the safety bolt passes through the safety bolt hole 7 for fixing the shock absorber and the rear fork.

Both sides of the rotating shaft 3 is installed with a pedal crank and a chain ring.

Both ends of the rear fork 2 are provided with end covers 14.

The clamping piece 12 is provided with a seat post mounting hole and two screw holes 16; the seat post mounting hole 15 is used for the mounting of a seat pole, and the two screw holes 16 are used to connect the girder and the hinge 9, and at the same time to fix the seat post.

The inside of the girder 1 is hollow, and the inside thereof can be provided with a battery pack and a controller.

The invention has a simple structure. After loosening the safety bolt, loosening the fixed screw, rotating the rear fork clockwise, and the shock absorber and the hinge are driven to rotate together to a certain position, and then tightening the fixing bolt to locate and lock the rear fork. The whole product adopts a multipurpose way of one axle, which realizes that the pedal axle and the folding axle can be shared, thereby reducing the frame components, reducing the weight of the whole bicycle, making the overall structure simpler, more convenient to fold, with a low manufacturing cost. The invention can be used for folding bicycles and electric bicycles.

The basic principles and main features of the invention are described hereinabove. Those skilled in the art should understand that the invention is not limited by the embodiments above. The foregoing embodiments and the description in the specification only illustrate the principle of the invention. Various modifications and improvements may be made without departing from the spirit and scope of the invention, which shall all fall within the scope of the claimed invention. The protection scope claimed by the invention is defined by the appended claims and the equivalents thereof.

What is claimed is:

1. A foldable bicycle and electric bicycle frame, comprising a girder and a rear fork, wherein the girder and the rear fork are connected to a rotating shaft through a bearing; both sides of the girder are provided with fixing holes A, and the girder is connected to the an upper part of a hinge through the fixing holes A; the lower part of the hinge is provided with fixing holes B, and the hinge is connected to the an upper part of a shock absorber through the fixing holes B; the a lower part of the shock absorber is connected to the rear fork through a fixing hole C; both ends of the rear fork are provided with end covers; an oblique upper part of the side wall of the girder relative to the fixing hole A is provided with a safety bolt hole.

2. The foldable bicycle and electric bicycle frame, according to claim 1, wherein one end of the girder is provided with a clamping piece, and the clamping piece is provided with a clamping hook; when the rear fork rotates together with the shock absorber until a top of the shock absorber is inside the clamping hook, the shock absorber comes into a shock absorption effect.

3. The foldable bicycle and electric bicycle frame, according to claim 1, wherein the fixing holes A, the fixing holes B, and the fixing holes C are connected by nuts after passing through a fixing screw; a safety bolt passes through the safety bolt hole for fixing the shock absorber and the rear fork.

4. The foldable bicycle and electric bicycle frame, according to claim 1, wherein the inside of the girder is hollow, and the inside thereof can be provided with a battery pack and a controller.

\* \* \* \* \*